United States Patent [19]
Bobel

[11] Patent Number: 5,448,137
[45] Date of Patent: Sep. 5, 1995

[54] ELECTRONIC ENERGY CONVERTER HAVING TWO RESONANT CIRCUITS

[75] Inventor: Andrzej A. Bobel, 201 Norman Ct., Des Plaines, Ill. 60016

[73] Assignee: Andrzej A. Bobel, Des Plaines, Ill.

[21] Appl. No.: 320,239

[22] Filed: Oct. 11, 1994

Related U.S. Application Data

[63] Continuation-in-part of Ser. No. 5,817, Jan. 19, 1993, Pat. No. 5,371,438.

[51] Int. Cl.$^6$ .................................. H05B 37/00
[52] U.S. Cl. ............................ 315/244; 315/200 R; 315/219; 315/224; 315/DIG. 5; 315/DIG. 7
[58] Field of Search ............... 315/244, 247, 224, 225, 315/200 R, 209 R, 205, 219, 291, 307, 308, DIG. 4, DIG. 5, DIG. 7

[56] References Cited

U.S. PATENT DOCUMENTS

| | | | |
|---|---|---|---|
| 4,017,785 | 4/1977 | Perper | 315/205 X |
| 4,109,307 | 8/1978 | Knoll | 315/DIG. 7 X |
| 4,523,131 | 6/1985 | Zansky | 315/307 |
| 4,782,268 | 11/1988 | Fahnrich et al. | 315/200 R |
| 4,965,493 | 10/1990 | Van Meurs et al. | 315/224 |
| 5,049,790 | 9/1991 | Herfurth et al. | 315/291 |
| 5,150,013 | 9/1992 | Bobel | 315/209 R |
| 5,185,560 | 2/1993 | Nilssen | 315/219 |
| 5,371,438 | 12/1994 | Bobel | 315/200 R |

FOREIGN PATENT DOCUMENTS 2115627  9/1983  United Kingdom.

Primary Examiner—Robert J. Pascal
Assistant Examiner—Haissa Philogene
Attorney, Agent, or Firm—Hill, Steadman & Simpson

[57] ABSTRACT

A power line-operated electronic converter is adapted to deliver a relatively constant magnitude high frequency signal to a load (113) and is operable to draw a substantially sinusoidal current from the AC voltage source (101). The converter has DC input terminals (V+, V−) having a capacitor (108) connected therebetween, rectifying bridge (103) and boosting rectifiers (D5,D6) coupled to the DC input terminals, a resonant oscillator circuit coupled to the DC input terminals and to the transistor inverter (106) employing two integrated and synchronized resonant circuits having two resonant capacitors (114,112) and one common resonant inductor (110) wherein one circuit is used to operate the load and the other to provide boosted pulsating DC voltage to be naturally added and integrated with the rectified voltage of the AC voltage source.

23 Claims, 8 Drawing Sheets

ELECTRONIC ENERGY CONVERTER HAVING TWO RESONANT CIRCUITS

This application is a continuation-in-part of my earlier filed application. Ser. No. 0/8005,817, filed Jan. 19, 1993, now U.S. Pat. No. 5,371,438.

BACKGROUND OF THE INVENTION

1. Field of the Invention

This invention relates to single stage electronic energy converters operated from alternating power line and capable of supplying, at the output, a load such as gas discharge lamp.

2. Description of Prior Art

The electronic energy converters, or as sometimes called "switching power supplies" need to operate directly from the alternating power line. Electric utility companies are setting requirements for specific groups of electricity-powered appliances in regards to power quality drawn by these appliances.

The electronic ballast, as one of the appliances, is used in large quantities in lighting fixtures. In general, to meet the industry requirements in regards to power quality, an electronic ballasts has to meet two fundamental requirements: (i) draw power from the power line with power factor (PF) of at least 0.9, (ii) draw current from the power line with total harmonic distortion (THD) of less than 20 percent.

The electronic ballast has to meet other requirements related to compatibility with a lamp-load. It shall provide lamp current crest factor of less than 1.7, where the "crest factor" is equal to a peak magnitude of the lamp current divided by its effective (RMS) value. This is related to maximum allowable modulation of the lamp current magnitude, which is responsible for light flicker and poor lamp efficacy expressed in lumens of light produced from each watt of power consumed. It is desirable to have constant power to be delivered to the lamp load over the entire cycle of the voltage supplied by the power line.

In order to convert the low frequency power line alternating voltage (120V/60 Hz or 220V/50 Hz) to high frequency (typically from 10 kHz to 100 kHz) alternating voltage or current source, one has to rectify the signal from the power line to a DC voltage which later is converted, by switching transistors, to the high frequency source.

Conventional off-line rectifiers have a capacitive smoothing filter located beyond a diode rectifier circuit. This smoothing capacitor causes harmonic distortion of the current waveforms during periods in which the rectified output is higher than the voltage over the smoothing capacitor, and during which time the capacitor charges up. This charging time, or conduction angle, is very small if large capacitor is used, and all the required charge has to be loaded into the capacitor in a short period of time. This results in a large current output from the rectified power line source. These current spikes increase the harmonic content of the power supply, and when large number of ballasts are operated from the power line, this increased harmonic distortion causes a poor power factor in the supply. This situation is not accepted upon by electricity supply authorities and causing interference with other electrical equipment.

Techniques for improving power factor include passive waveform shaping methods. One of them is described in U.S. Pat. No. 5,150,013 issued to BOBEL. This method requires an inductor to operate in resonant mode with a capacitor, and the resonant frequency is approximately 180 Hz when power line frequency is 60 Hz. Is is inexpensive and reliable method. However, the inductor must be large in size.

It is known to use a storage conversion principle, whereby an inductor is controlled at high frequency in order to allow charging of the smoothing capacitor over wide conduction angle. The system, however, requires a control circuit for the storage converter, known also as "boost converter", in order to regulate the discharge of energy from the storage inductor. Such use of the storage conversion principle requires additional noise filtering, because large amount of noise is being generated by switching devices. The circuit is very complex and expensive to produce. Furthermore, the second stage converter is necessary to convert the DC voltage source to the high frequency alternating voltage or current source. This type circuit is described in U.S. Pat. No. 5,049,790 issued to Herfurth.

It is highly desirable to have simple and low cost single stage electronic energy converter. Such a circuit shall have low parts count and cost, it shall be adaptable to all power line voltages and lamps kinds, it shall be easy manufacturable in large quantities with great repeatability as required by industry quality standards, it shall meet the power quality standards and draw power from the power line with near-sinusoidal current waveform and provide near-constant power to the lamp over the entire cycle of power line voltage waveform.

SUMMARY OF THE INVENTION

In accordance with the invention there is provided an energy conversion device having a DC pulsating voltage at DC input terminals and adapted to deliver a high frequency signal to a load, the device comprising:

rectifier means receiving a source voltage from an AC power source and providing at first DC output terminals a first pulsating DC voltage;

boosting rectifier means having a boost input terminal and providing a second pulsating voltage at second DC output terminals wherein said first and second DC output terminals are suitably oriented, connected in circuit, and coupled to the DC input terminals, and provide the DC pulsating voltage equal to the sum of the first DC pulsating voltage and the second DC pulsating voltage;

capacitor means coupled to the DC input terminals and receiving said DC pulsating voltage;

semiconductor switching means coupled to the capacitor means;

resonant oscillator means operable to draw a pulsating current from the DC input terminals and operable to develop the second DC pulsating voltage, and said oscillator circuit comprises: (i) a resonant load circuit coupled to the DC input terminals and to the semiconductor switching means, and having an inductor and a first capacitor connected in series, and having the load connected effectively in parallel to said first capacitor, (ii) a resonant boost circuit having the inductor connected in series with a second resonant capacitor and coupled to the boost input terminal and to the semiconductor switching means, and (iii) a switching feedback loop coupled to the semiconductor means and responsive to instantaneous magnitude of the pulsating current and operable to deliver to the semiconductor switching means a switching signal modulated in proportion to the modulation of instantaneous magnitude of the second DC pulsating voltage.

The device further comprising the rectifier means as unidirectional devices connected in the form of a ordinary bridge circuit and having positive and negative first DC output terminals, respectively, and the rectifier means having each of the unidirectional devices exhibit a switching action characterized by an ON-time period when conducting electrical current, and characterized by OFF-time period when not conducting electrical current.

The device further comprising the boosting rectifier means as two unidirectional devices connected in series via boost input terminal.

The device further comprising the capacitor means as polarized electrolytic capacitor.

The device further comprising the semiconductor switching means as a pair of npn bipolar transistors connected in a half-bridge configuration for alternating operation.

The device further comprising the resonant oscillator means having the switching feedback loop equipped with a non-saturable current transformer.

The device further comprising the resonant oscillator means which has the switching feedback loop equipped with a saturable current transformer.

The device further comprising the saturable current transformer made with a toriodal ferrite core having an initial permability of 5000 or more and size of 6 millimeters in diameter and 3 millimeters in height.

The device further comprising the resonant oscillator means which has the saturable current transformer equipped with one turn primary winding and few turns each secondary windings.

The device further comprising the resonant oscillator means which has the switching feedback loop equipped with a control circuit.

The device of present invention operates with the instantaneous frequency of oscillation of the resonant oscillator means modulated in proportion to the modulation of instantaneous magnitude of the second DC pulsating voltage.

The device of present invention has the semiconductor switching means which exhibit an instantaneous switching duty cycle modulated in proportion to the modulation of instantaneous magnitude of the second DC pulsating voltage.

In such a device the instantaneous magnitude of input current is proportional to the instantaneous magnitude of the power line voltage, and the total harmonic distortion of the current is below 20%. In result, power is drawn from the power line with power factor of 99%, lamp current crest factor is below 1.7.

Other objects and advantages of the present invention shall be made clear in following description of the invention detailed with reference to various embodiments of the invention as shown in accompanying drawings.

DESCRIPTION OF THE PREFERRED EMBODIMENTS

Figure 1:
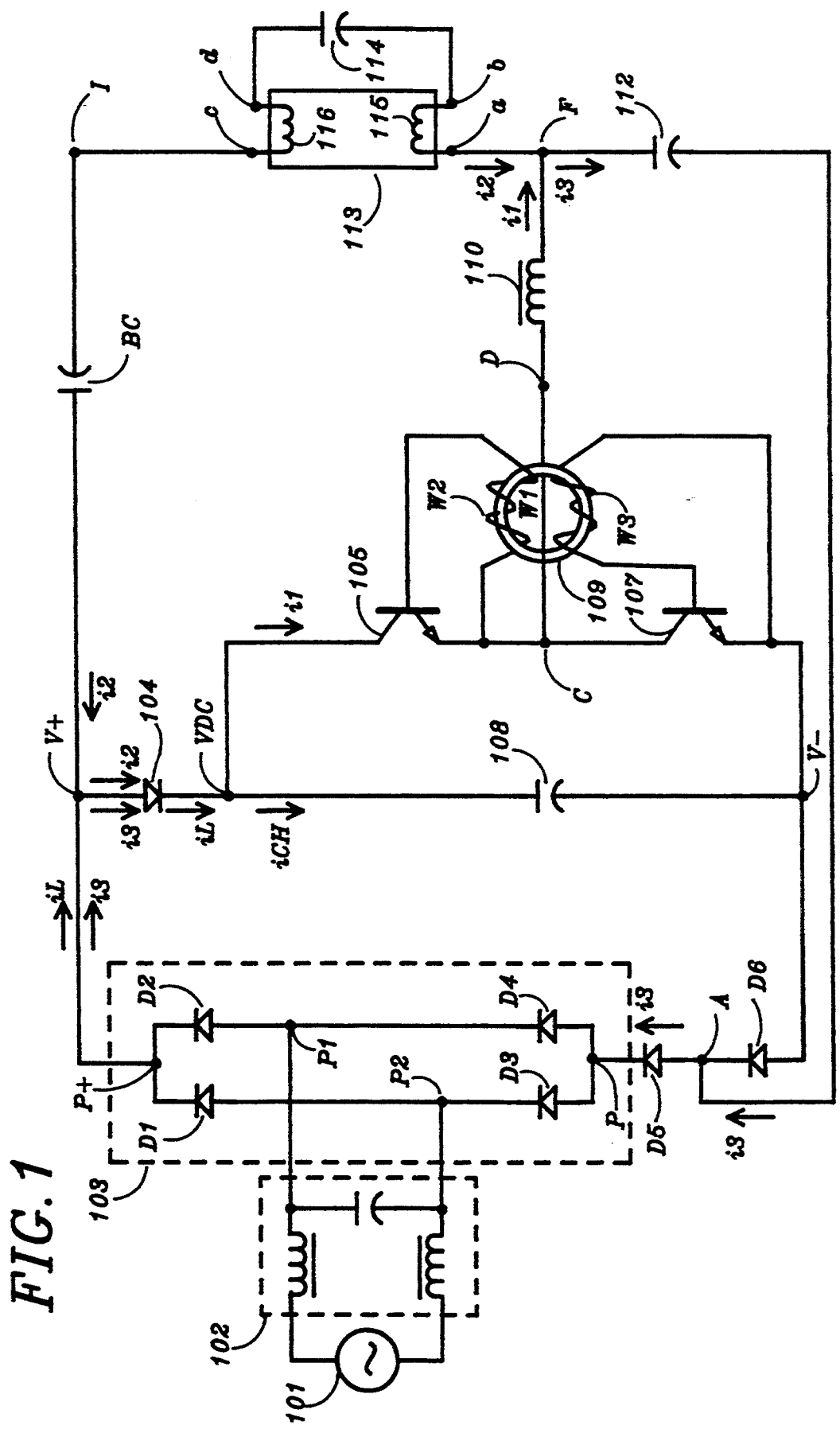
FIG. 1 schematically illustrates the invention in its main preferred embodiment.

FIG. 1 schematically illustrates the main preferred embodiment of the invention in the form of an electrical circuit diagram.

In FIG. 1 a voltage source 101 represents an ordinary 120Volt/60 Hz electric utility power line and is connected through a RFI/EMI filter 102 to AC input terminals P1 and P2 of a full wave rectifier bridge 103. The bridge 103 is made of four rectifier diodes and has a pair of DC output terminals P+,P− where the terminal P+ is a positive and the terminal P− is a negative. Two diodes D5,D6 are connected in series via boost input terminal A. A cathode electrode of the diode D5 is connected to the terminal P− and an anode electrode of the diode D6 is connected to a DC input terminal V−. The terminal P+ of the bridge 103 is connected to another DC input terminal V+.

A diode 104 is connected with its anode electrode to the terminal V+ and with its cathode electrode to a node VDC. A storage capacitor 108 is connected between the node VDC and the terminal V−.

A half-bridge switching transistor inverter 106 has a bipolar transistor (of the type MJE 13005) connected at its collector electrode to the node VDC. The transistor 105 has its emitter electrode connected to a node C. A further npn transistor 107 (like the transistor 105, of the type MJE 13005) of the inverter has its collector electrode connected to the node C. The transistor 107 has its emitter electrode connected to the terminal V−.

A resonant oscillator circuit consisting of two integrated and coupled resonant circuits. The first resonant circuit has a DC blocking capacitor BC (having value of approximately 0.1 uF), and first resonant capacitor 114 (having value of approximately 18 nF), and resonant inductor 110 (having value of approximately 1 mH), and a primary winding W1 of a feedback transformer 109, all connected in series between terminal V+ and the node C, via filaments 116,115 of a gas discharge lamp 113. Thereby, the gas discharge lamp (of the type Dulux E 26W by Osram) is effectively connected across the resonant capacitor 114 via two pairs of lamp terminals a–b,c–d. The second resonant circuit has the same resonant inductor 110, and second resonant capacitor 112, and the primary winding W1 of the feedback transformer, all connected in series between node C and the boost input terminal A. The feedback transformer 109 is equipped with two secondary windings W2,W3 connected across base-emitter junctions of the switching transistors 105,107, respectively. A junction F is a common terminal of both resonant circuits equipped with one common inductor 110 and two resonant capacitors 114 and 112. This device can be made operational with either saturable core or non-saturable core used in design of the feedback transformer. The saturable core used is made by Magnetics, Inc. of Butler, Pa., model No. OW40603-TC. The non-saturable core feedback transformer may be designed with core made by Magnetics, Inc., model No. J-42510-EC.

Figure 2:
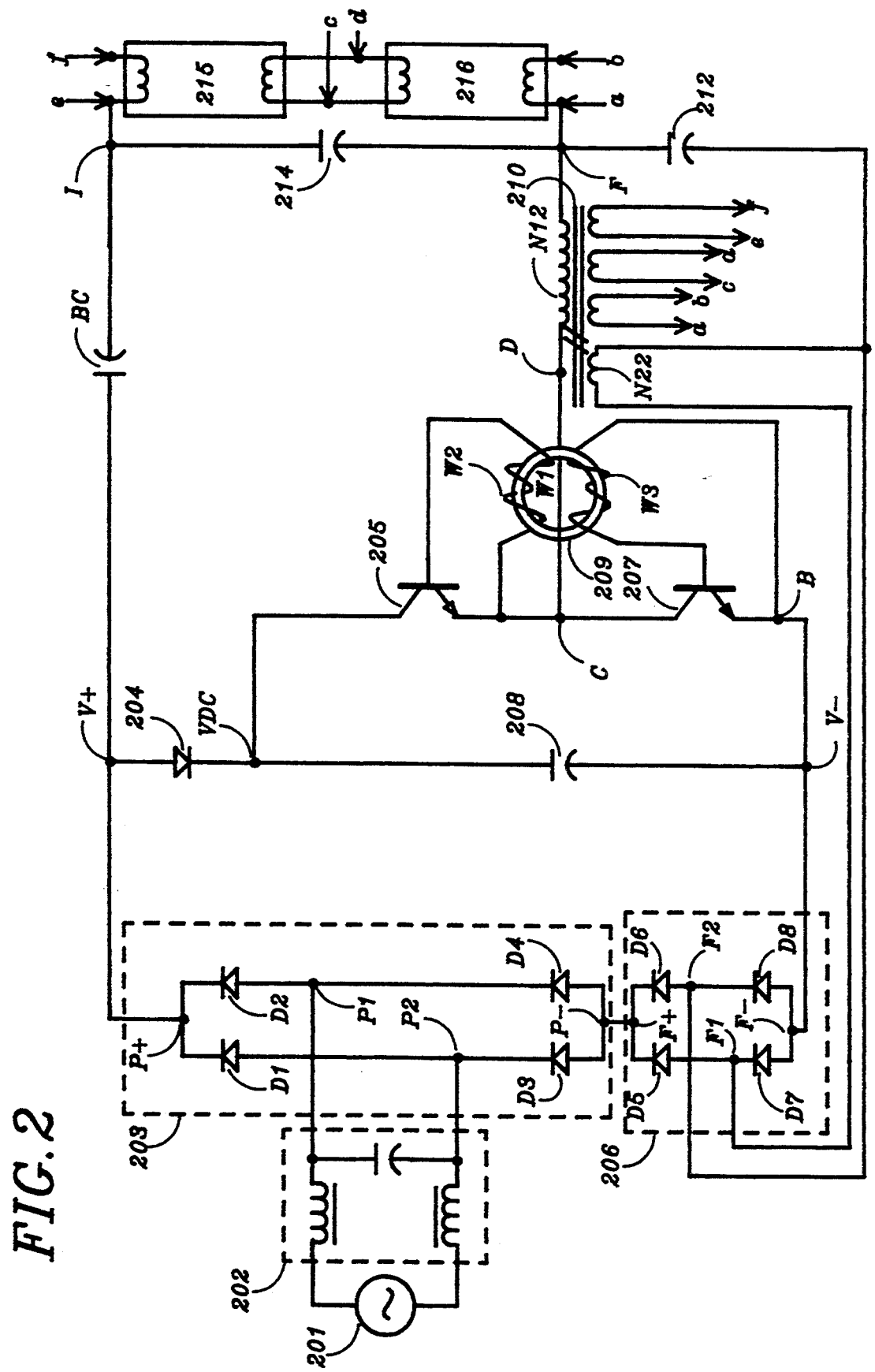
FIG. 2 schematically illustrates the invention in its second embodiment.

FIG. 2 illustrates a second embodiment of the invention in combination of the invention described and claimed in the parent application Ser. No. 08/005,817 of the present inventor. The secondary winding N22 of the resonant inductor 210 is connected to a pair of AC input terminals F1,F2 of a bridge 206. This embodiment has also two resonant circuits comprised of two resonant capacitors 214,212 and one common resonant inductor 210. Two gas discharge lamps 215,216 connected in series are implemented and having three pairs of filament terminals a–b, c–d, and e–f connected to respected filament windings of the resonant inductor 210.

Figure 3:
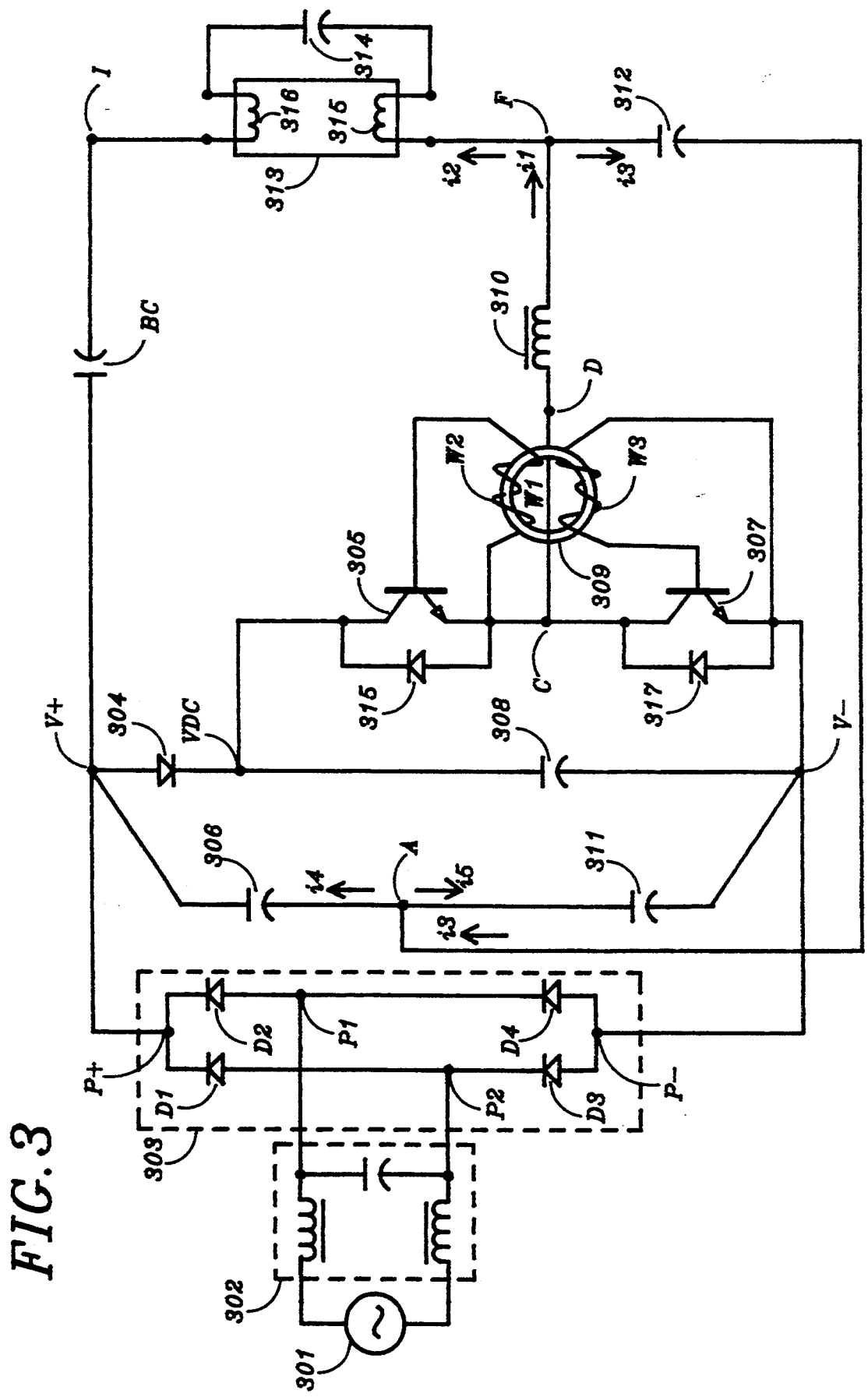
FIG. 3 schematically illustrates the invention in its third embodiment.

FIG. 3 illustrates yet another embodiment of the present invention wherein two boost capacitors 306 and 311 are connected in series via boost input terminal A, and connected between DC input terminals V+,V−. In this circuit, as is in circuit of FIG. 1, two resonant circuits are implemented having first and second resonant capacitors 314,312 and one common resonant inductor 310. The second resonant capacitor 312 is connected to the boost input terminal A.

Figure 4:
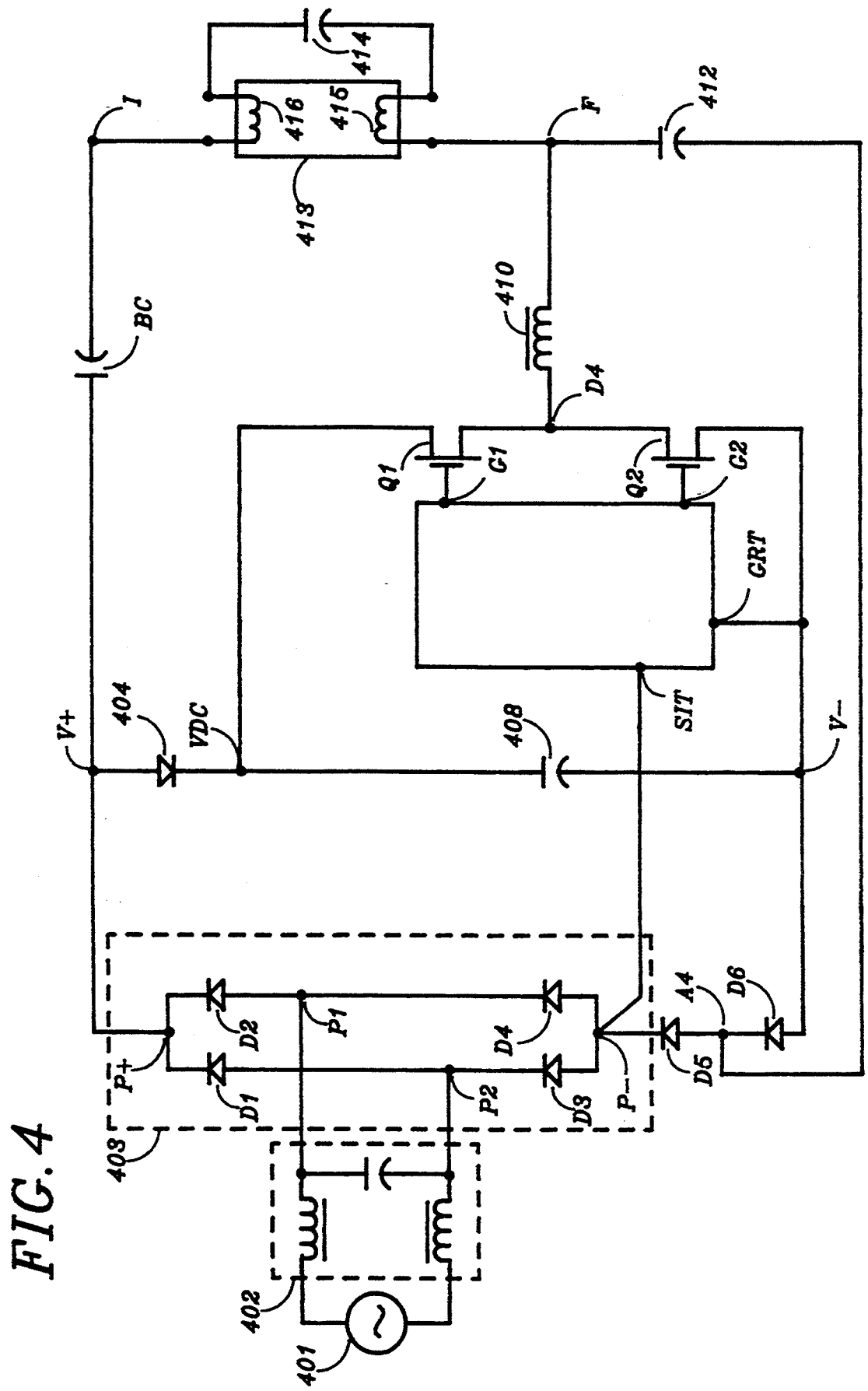
FIG. 4 illustrates an alternative version of the invention of FIG. 1.

FIG. 4 illustrates an alternative version of the present invention described in FIG. 1. The resonant oscillator is equipped with a Control Circuit which has at least four terminals as follows: signal input terminal SIT, ground terminal GT, and two gate terminals G1,G2, respectively.

Figure 5:
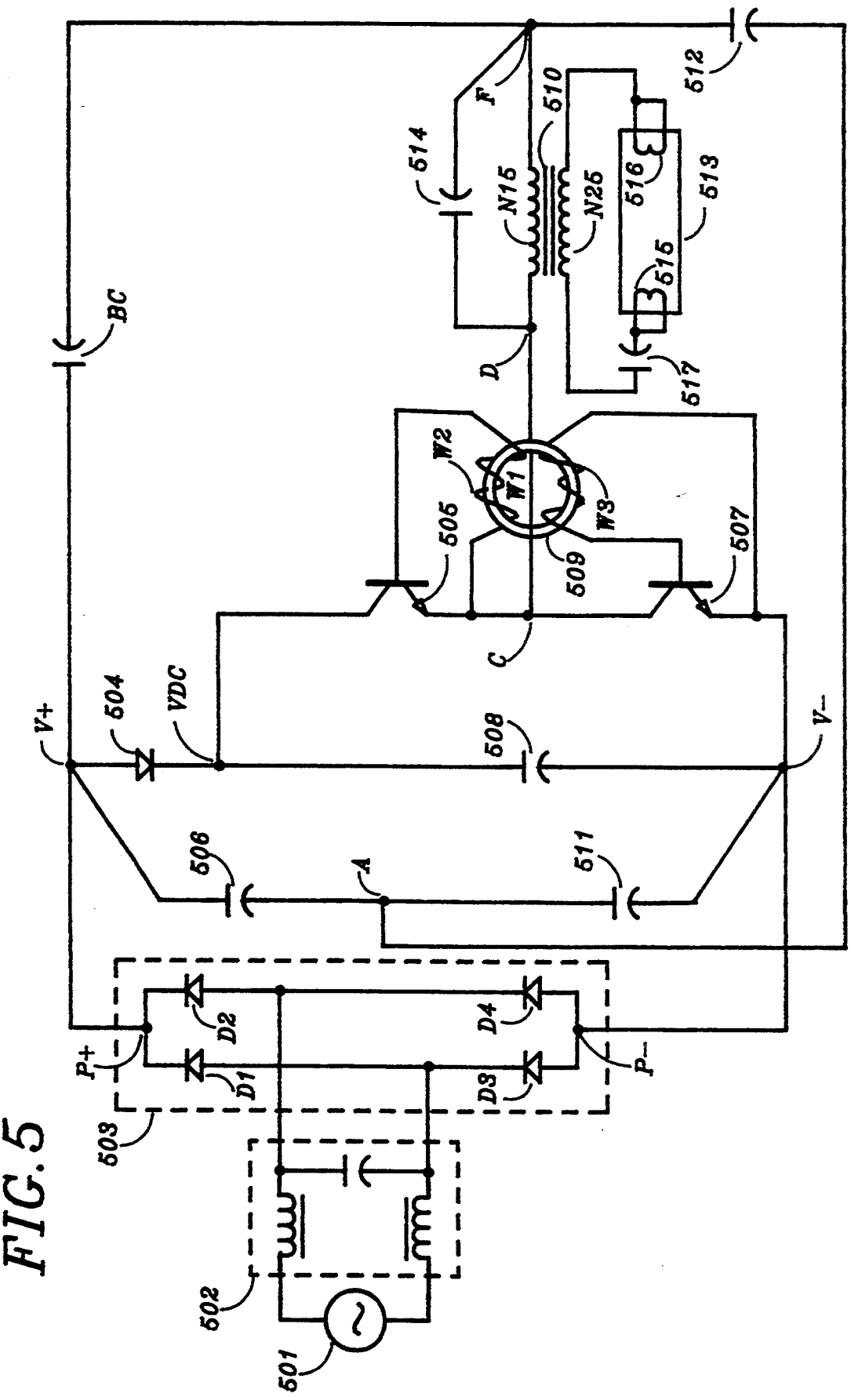
FIG. 5 illustrates an alternative version of the invention of FIG. 3.

FIG. 5 illustrates an alternative version of the present invention wherein resonant oscillator circuit comprising two resonant circuits. The first resonant circuit has a DC blocking capacitor BC connected in series with a primary winding N15 of a resonant inductor 510, and with a primary winding of a feedback transformer 509, all connected between the terminal V+ and the node C. A first resonant capacitor is connected in parallel with the primary winding N15 of the resonant inductor 510. A second resonant circuit has serially connected winding W1 of the feedback transformer, the primary winding N15 of the same resonant inductor 510 and a second resonant capacitor 512, all connected between the node C and boost input terminal A. The resonant inductor 510 is equipped also with a secondary winding N25 and has a gas discharge load 513 connected to that winding via current limiting capacitor 517.

Figure 6:
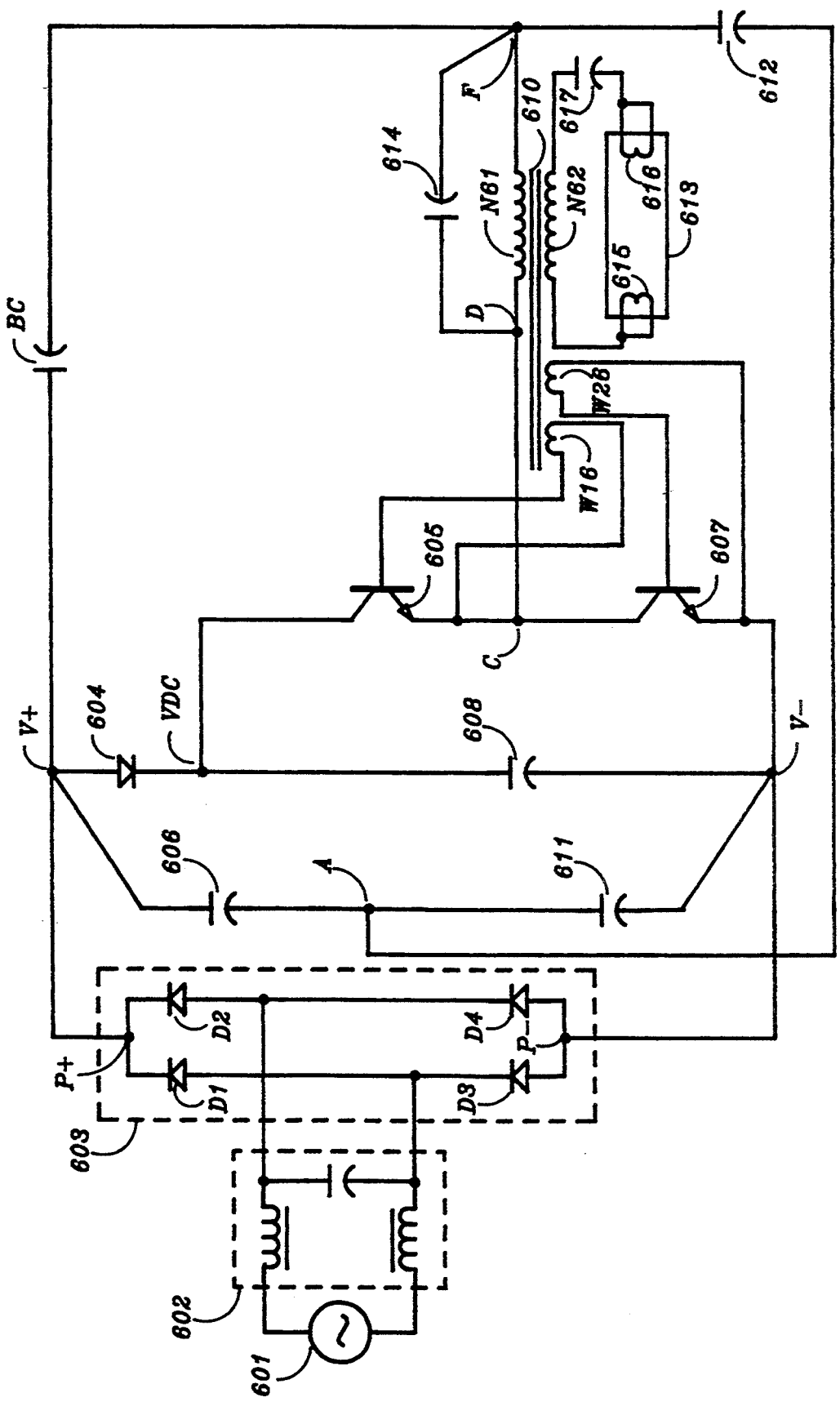
FIG. 6 illustrates yet another alternative version of the invention of FIG. 3.

FIG. 6 illustrates yet another alternative version of present invention wherein the feedback transformer is eliminated and switching feedback signal is provided to the switching transistors by means of secondary windings W16,W26 magnetically coupled to the resonant inductor 610.

It is obvious that more alternative versions or different combinations may be possible to create by those skilled in the art, for example, improvements and resonant oscillator of FIG. 6 can be used in combination of boost input terminal A and diodes D5,D6 of FIG. 1.

DETAILS OF OPERATION

In order to clearly describe the operation of the device of FIG. 1. the second resonant capacitor 112 will be not connected to the boost input terminal A.

Figure 7A:
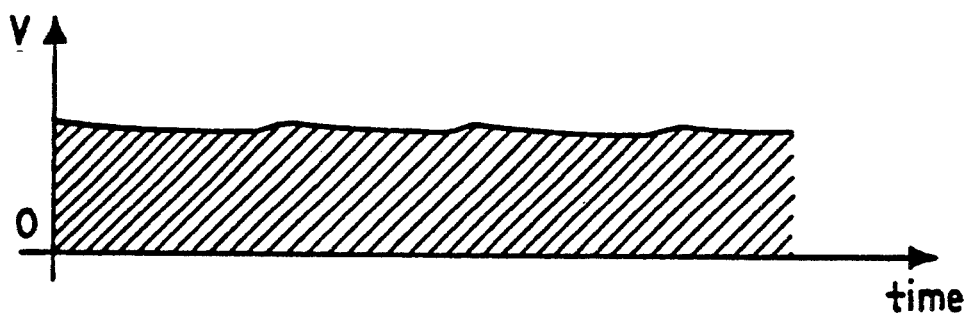
FIGS. 7(a)–7(d) and FIGS. 8(a)–8(d) show various current and voltage waveforms associated with the operation of the main preferred embodiment.

FIGS. 7(a)–7(d) indicate various current and voltage waveforms illustrative of the operation of the device of FIG. 1 with the capacitor 112 not connected to the terminal A. With reference to the waveforms of FIGS. 7(a)–7(d) the operation of the device of FIG. 1 is very similar to the device explained in U.S. Pat. No. 3,084,283 issued to Grunwaldt. The differences are objects of this invention accomplished by providing the rectifier bridge 103 connected in series with diodes D5 and D6, and diode 104 connected in series with storage capacitor 108. By implementing such improvements, new behavior of the device was discovered. A DC input voltage developed across DC input terminals V+,V−, as per FIG. 7(a) is a result of commonly known rectification of voltage delivered by AC voltage source 101 and filtering by capacitor 108.

The device starts oscillation by triggering provided with a commonly known diac circuit (not shown). The converter is delivering a constant magnitude voltage and constant magnitude current into the lamp load 113. The frequency of the switching inverter 106 is equal to resonant oscillation frequency of the series resonant tank circuit which includes load 113 connected in parallel to resonant capacitor 110 and in series with the resonant inductor 110.

The device draws a pulsating current from the energy storing capacitor 108 and from the power line via bridge 103. The pulsating current flows periodically through diodes D6 and D5. Whenever diodes D5 and D6 are conducting the pulsating current, the DC input terminal V− is in effect connected to the terminal P− of the bridge 103. Therefore, the diodes exhibiting a switching ON/OFF action due to flow of the pulsating current.

The peak magnitude of the DC input voltage between terminals V+,V− is equal to peak magnitude of the rectified AC voltage source 101.

Figure 7B:
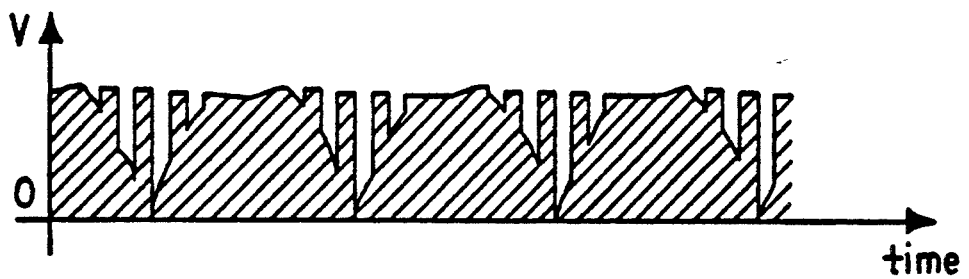
Figure 7C:
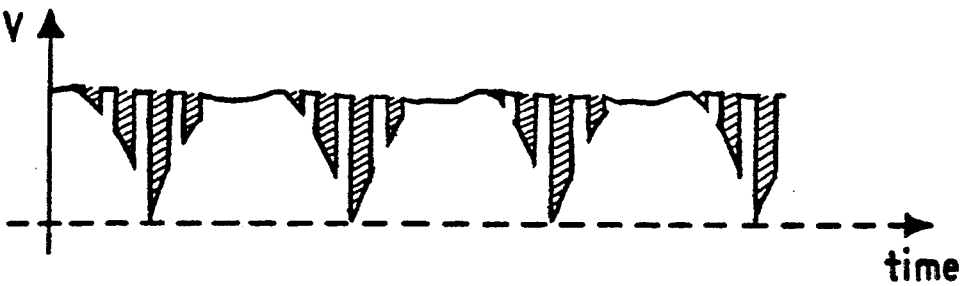
Figure 7D:
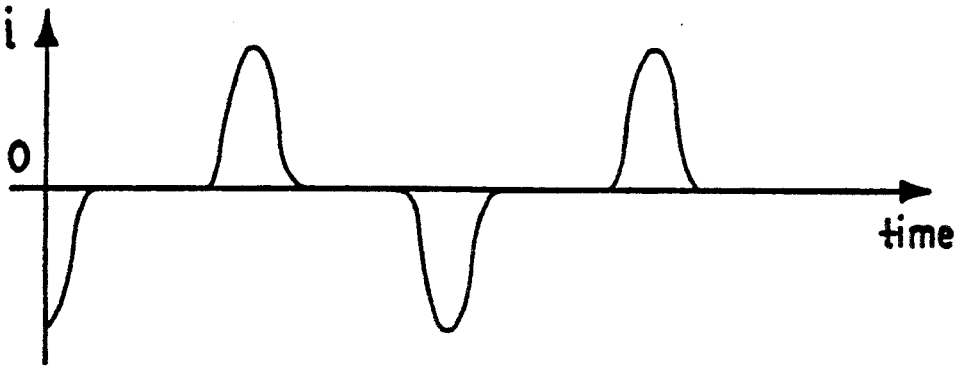

The waveform of the voltage across terminals P+,P− of the bridge 103 is presented in FIG. 7(b). A waveform of the voltage developed between terminals P−,V− (both diodes D5,D6) is presented in FIG. 7(c). At any moment during operation of the device, the instantaneous magnitude of the DC input voltage (as per FIG. 7(a)) is equal to a sum of instantaneous magnitude of the rectified AC voltage source (as per FIG. 7(b)) and instantaneous magnitude of the voltage developed across both diodes D5,D6 (as per FIG. 7(c)). The waveform of the input current is presented in FIG. 7(d).

The oscillation frequency (fo) of such series resonant circuit can be expressed by the following formula:

$$W = \sqrt{\frac{1}{LC} - \frac{1}{4R^2C^3}}$$

where:
 =2 fo $\omega = 2\pi fo$
L=inductance of the resonant inductor 110;
C=capacitance of the resonant capacitor 114;
R=resistance of the load;

A feedback signals obtained by the switching feedback windings W2,W3 of the feedback transformer 109 for the self-oscillation of the converter is in phase with an output current delivered at the output terminals I,F. Thus, the frequency obtained always adjusts itself—in proportion to instantaneous magnitude of the DC input voltage at the terminals V+,V− and according to changes of the load 113 connected across first resonant capacitor 114. Under these conditions, it can be proved that, if the resonant inductor 110 and resonant capacitor are free of losses, the current supplied to the load 114 is dependent of the resistance of the load thereof. This current depends only upon the DC input voltage at the terminals V+,V− and upon the quotient $$\frac{L}{C}.$$

Furthermore, the output voltage magnitude is relatively constant as this is a characteristic of a gas discharge load. Thus, the voltage magnitude across the resonant inductor is relatively constant, as this is a characteristic of the series resonant circuit, where voltage magnitude across the resonant capacitor is directly proportional to voltage magnitude across the resonant inductor. This series resonant circuit is high-Q type with ability to produce across it resonant components 110,114 voltages of much higher magnitudes than DC input voltage magnitude. And the voltages across the resonant components 114,110 can be easily modulated by providing modulation of instantaneous value of either: the load 113, the inductor 110, or the capacitor 114. The same can be accomplished by limiting and modulation of magnitude of the voltage across one of the resonant components.

The operation of the device of FIG. 1 when the connection of the second resonant capacitor 112 is provided at the boost input terminal A will be referenced to waveforms of FIGS. 8(a)–8(d).

Figure 8A:
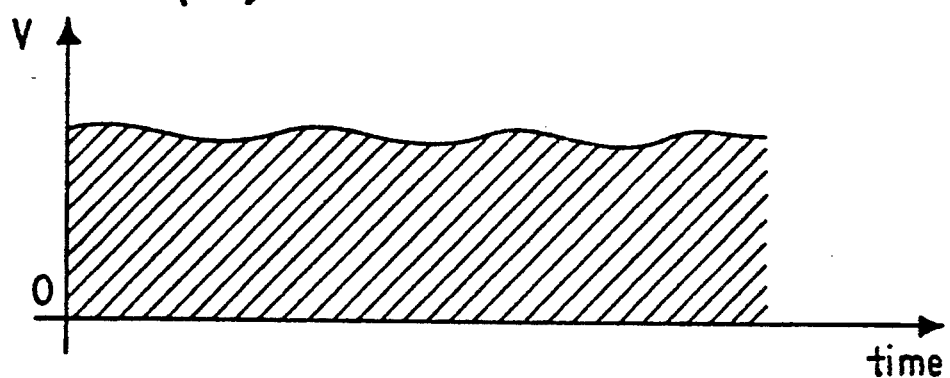
Figure 8B:
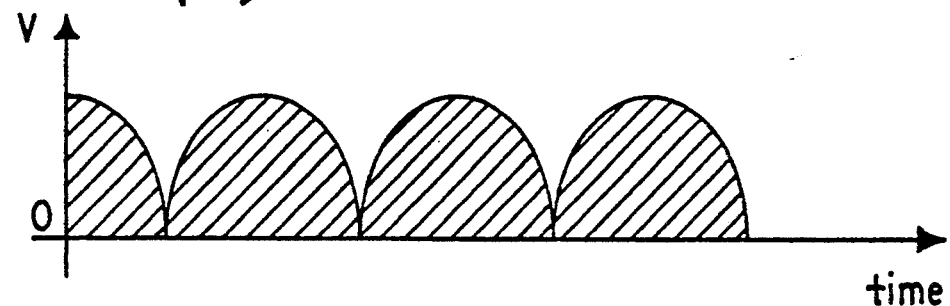
Figure 8C:
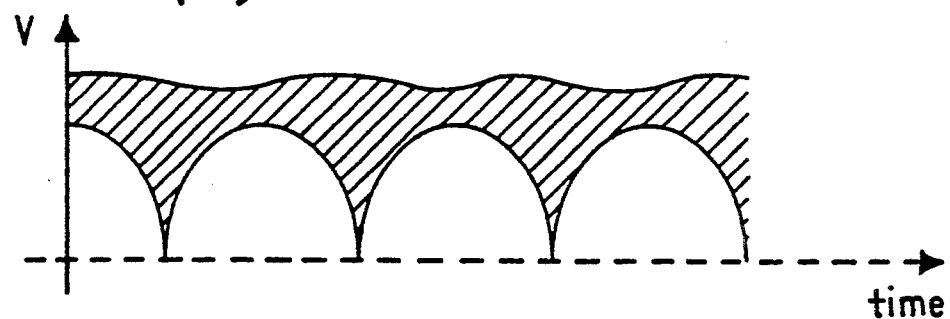
Figure 8D:
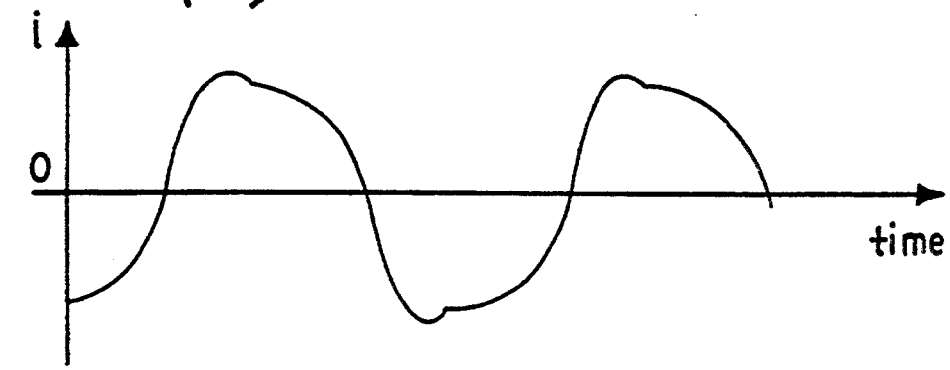

Whenever the capacitor 112 connection is provided at the terminal A, the interaction of input and output of the device begins. Such an interaction is an effect of development of resonant boost circuit having ability to store and release energy. The diode D6 is acting as a switching device of the boost circuit and is ON when the transistor 107 is conducting and said diode is OFF when the transistor 105 is conducting. Both transistor conduct current periodically and alternately as is in any commonly known two transistor inverter. The diode D5, however, is acting as boost diode of a commonly known boost circuit. Whenever the instantaneous voltage developed between terminals A and V— is higher than instantaneous voltage v(t) present across the storage capacitor 108, diode D5, and diodes of the bridge 103, and diode 104, all will conduct capacitor charging current iCH for as long until said voltages become equal. It may be that at the end of the particular oscillatory period, when the transistors reverse its states, current will continue to flow from terminal A, but this time to the load 113 via capacitor BC. Whenever the transistor 107 conducts current the second resonant circuit stores energy which is released in the period when the transistor 105 conducts current. Both resonant circuits are integrated by having common resonant inductor 110. The first resonant circuit is series resonant with load 114 connected in parallel to the resonant capacitor. The second resonant circuit, however, is series resonant with a boost load connected in series with both resonant capacitor and resonant inductor. The boost load is a complex load represented by impedance of the storage capacitor, as equivalent series resistance, and losses of all active and passive circuit components, and the load 113, all connected in arrangements as per circuit of FIG. 1. Such variable and complex load arrangement which is changing in very dynamic way effects modulation of the resonant circuit gain, accordingly. Therefore, the impedance character (less or more inductive) of the entire resonant oscillator is changing also in proportion to the changes mentioned above. The instantaneous magnitude of the voltage developed across switching diode D6 and boost diode D5 is in effect transformed to an instantaneous magnitude of a boost load connected in series with the second resonant circuit. However, despite such modulations, the magnitude of the pulsating current i1 which flows through the resonant inductor, and magnitude of the load current are being kept relatively constant due to instantaneous self-adjustment of the switching frequency of the resonant oscillator by the feedback transformer 109, so the impedance effective value associated with the first series resonant circuit is being kept relatively constant. The voltage magnitude between terminals P—,V— (as per FIG. 8(c)) is equal again to a difference of instantaneous magnitude of the DC input voltage developed across terminals V+,V— and instantaneous magnitude of rectified, not filtered voltage between terminals P+ and P—, the later being provided by rectified AC voltage source and is shown in FIG. 8(b).

The peak magnitude of the DC input voltage is equal or higher than peak magnitude of the rectified AC voltage source. The parameters of determining the magnitude of that voltage, as per FIG. 8(a), are: instantaneous and effective load value and Q-factors of the first and second series resonant circuits. The above parameters are most important factors in obtaining the device stability and proper operation.

It will be appreciated that due to the implementation of the second resonant circuit as resonant boost circuit the voltage magnitude to which the capacitor 108 is charged, being partially provided by AC voltage source and partially provided by the resonant boost action. Thus, a charging current iCH of the capacitor 108 is partially provided by AC voltage source, and partially by the resonant boost circuit. Therefore, the input current waveform (as per FIG. 8(d)) taken from the AC voltage source is substantially proportional to the voltage waveform of the AC voltage source. The power is drawn from the power source with power factor of 99%, and current delivered to the device from the source is having total harmonic distortion below 20%.

It will be appreciated that due to implementation of the resonant boost circuit integrated with the resonant circuit which operates the load, according to the present invention, the modulation of frequency dependent impedance characters of these circuits in proportion to the modulation of instantaneous magnitude of the voltage equal to a difference between instantaneous magnitude of the DC input voltage and instantaneous magnitude of the rectified AC voltage source is developed. Accordingly, it will be appreciated that due to implementation of the resonant boost circuit integrated with other resonant circuit which operates the load, the frequency of oscillation of the resonant oscillator made with said circuits is modulated in proportion to the modulation of instantaneous magnitude of the voltage equal to a difference between instantaneous magnitude of the DC input voltage and instantaneous magnitude of the rectified AC voltage source. In result, the instantaneous magnitude of the current drawn from the AC voltage source is substantially proportional to the instantaneous magnitude of the voltage provided by said AC voltage source, and the amplitudes of the voltage and current delivered to the load, are relatively constant.

In regards to device of FIG. 2 which is a second embodiment of the present invention the feedback winding N22 of the resonant inductor 210 is provided in combination with the resonant boost circuit as in device of FIG. 1. Operation of the circuit is similar to the one described in FIG. 1. with addition of the feedback winding coupled to the resonant inductor and connected to the AC terminals of the bridge 206, the effective inductance value of the resonant inductor is modulated here in proportion to the modulation of the voltage present at terminals F+,F−. In effect this device operates providing the same results as device of FIG. 1. It may be selected as a design choice when improvement of the energy feedback is necessary to provide proper input and output parameters of the device.

In regards to device of FIG. 3 which is another embodiment of the present invention the diodes of the rectifying bridge 303 perform boost switching and rectifying functions. The boost capacitors 306,311 are being periodically charged by the resonant boost circuit via capacitor 312, and discharged periodically whenever the voltage across storage capacitor is lower than voltage across DC input terminals V+,V−. This embodiment is used when the device is required to operate the variety of different lamps types in regards to its power ratings and sizes. Two integrated resonant circuits having one common resonant inductor interact in such a way that input and output parameters within large range of output power are being kept within desired specifications.

The device of FIG. 4 is an alternative version of the device of FIG. 1 wherein the Control Circuit perform the function of the feedback transformer of the device of FIG. 1. The Control Circuit senses the instantaneous magnitude of the voltage across terminals P−,V− and provides to the transistors Q1, Q2 switching signals in proportion to said magnitude. Thus, the switching frequency of the oscillator circuit is modulated in proportion to the modulation of the amplitude of the voltage between terminals P− and V−. All other aspects of the operation of this device are identical to the operation of the device of FIG. 1.

The device of FIG. 5 is an alternative version of device of FIG. 4 which has implemented the parallel resonant circuit as the first resonant circuit, and series resonant circuit as the resonant boost circuit. The parallel resonant circuit comprises a capacitor 514 which is operates in parallel resonant with the inductance of the primary winding N15. The boost resonant circuit, however, operates as the series resonant circuit wherein the same inductor interacts with the capacitor 512. The coupling and integration of these resonant circuits results in development of resonant oscillator circuit wherein the switching signal is provided to the transistors by the feedback transformer 509. In this embodiment, like in the described embodiment of FIG. 3, the energy stored in the boosting resonant circuit which includes boosting capacitors 506 and 511, is naturally released and provided as additional voltage to the rectified AC voltage source.

FIG. 6, attached hereto represents the alternative version of the device of FIG. 5. The circuit shown here is identical in operation to the one of FIG. 5, with the exception that the switching feedback is accomplished with use of secondary windings W16,W26 operable to provide switching signal proportional to the pulsating voltage which is developed across both resonant elements 614, N61 of the parallel resonant circuit.

It will thus be appreciated that the devices, as described herein will provide for substantial stability of its critical parameters (input power, power factor, total harmonic distortion, load current crest factor) despite: large variations of nominal AC voltage source, b) application of other than nominal load type, c) subjecting the devices to low and high temperatures.

It will be appreciated that device as described herein, will be very simple—with very low parts count, easily adaptable to all power line voltages and load types, repeatable in manufacturing process, and inexpensive.

It will be also appreciated that various other modifications or alternatives to the above described embodiments will be apparent to the person skilled in the art without departing from the inventive concept described herein.

I claim:

1. An energy conversion device having a DC pulsating voltage at DC input terminals and adapted to deliver a high frequency signal to a load, the device comprising:

rectifier means receiving a source voltage from an AC power source and providing at first DC output terminals a first pulsating DC voltage;

boosting rectifier means having a boost input terminal and providing a second pulsating voltage at second DC output terminals wherein said first and second DC output terminals are suitably oriented, connected in circuit, and coupled to the DC input terminals, and provide the DC pulsating voltage equal to the sum of the first DC pulsating voltage and the second DC pulsating voltage;

capacitor means coupled to the DC input terminals and receiving said DC pulsating voltage;

semiconductor switching means coupled to the capacitor means;

resonant oscillator means operable to draw a pulsating current from the DC input terminals and operable to develop the second DC pulsating voltage, and said oscillator circuit comprises: (i) a resonant load circuit coupled to the DC input terminals and to the semiconductor switching means, and having an inductor and a first capacitor connected in series, and having the load connected effectively in parallel to said first capacitor, (ii) a resonant boost circuit having the inductor connected in series with a second resonant capacitor and coupled to the boost input terminal and to the semiconductor switching means, and (iii) a switching feedback loop coupled to the semiconductor means and responsive to instantaneous magnitude of the pulsating current and operable to deliver to the semiconductor switching means a switching signal modulated in proportion to the modulation of instantaneous magnitude of the second DC pulsating voltage.

2. The device according to claim 1 wherein the rectifier means has unidirectional devices connected in the form of a ordinary bridge circuit and having positive and negative first DC output terminals, respectively, and the rectifier means having each of the unidirectional devices exhibit a switching action characterized by an ON-time period when conducting electrical current, and characterized by OFF-time period when not conducting electrical current.

3. The device according to claim 1 wherein the boosting rectifier means has two unidirectional devices connected in series via boost input terminal.

4. The device according to claim 1 wherein the capacitor means comprises a polarized electrolytic capacitor.

5. The device according to claim 1 wherein the semiconductor switching means has a pair of npn bipolar transistors connected in a half-bridge configuration for alternating operation.

6. The device according to claim 1 wherein the resonant oscillator means having the switching feedback loop equipped with a non-saturable current transformer.

7. The device according to claim 1 wherein the resonant oscillator means has the switching feedback loop equipped with a saturable current transformer.

8. The device according to claim 7 wherein the saturable current transformer is made with a toriodal ferrite core having an initial permability of 5000 or more and size of 6 millimeters in diameter and .3 millimeters in height.

9. The device according to claim 7 wherein the resonant oscillator means has the saturable current transformer equipped with one turn primary winding and few turns each secondary windings.

10. The device according to claim 1 wherein the resonant oscillator means has the switching feedback loop equipped with a control circuit.

11. The device according to claim 1 wherein the instantaneous frequency of oscillation of the resonant oscillator means is modulated in proportion to the modulation of instantaneous magnitude of the second DC pulsating voltage.

12. The device according to claim 1 wherein the semiconductor switching means exhibit an instantaneous switching duty cycle modulated in proportion to the modulation of instantaneous magnitude of the second DC pulsating voltage.

13. An energy conversion device having a DC pulsating voltage at DC input terminals and adapted to deliver a high frequency signal to a load, the device comprising:
   rectifier means receiving a source voltage from an AC power source and providing at first DC output terminals a first pulsating DC voltage;
   boosting rectifier means having boost input terminals and second DC output terminals wherein said first and second DC output terminals are suitably oriented connected in circuit and coupled to the DC input terminals and provide the DC pulsating voltage equal to the sum of the first DC pulsating voltage and the second DC pulsating voltage;
   capacitor means coupled to the DC input terminals and receiving said DC pulsating voltage;
   semiconductor switching means coupled to the capacitor means;
   resonant oscillator means operable to draw a pulsating current from the DC input terminals and operable to develop the second DC pulsating voltage, and said oscillator circuit comprises: (i) a resonant load circuit coupled to the DC input terminals and to the semiconductor switching means, and having an inductor and a first capacitor connected in series, and having the load connected effectively in parallel to said capacitor, (ii) a resonant boost circuit having the inductor and second resonant capacitor connected in series and coupled to at least one the boost input terminals and to the semiconductor switching means, (iii) an energy feedback winding magnetically coupled to the inductor and connected to the boost input terminals, and (iv) a switching feedback loop coupled to the semiconductor switching means and responsive 0to instantaneous magnitude of the pulsating current and operable to deliver to the semiconductor switching means a switching signal modulated in proportion to the modulation of instantaneous magnitude of the second DC pulsating voltage.

14. The device according to claim 13 wherein the rectifier means has unidirectional devices connected in the form of a ordinary bridge circuit and having positive and negative first DC output terminals, respectively.

15. The device according to claim 13 wherein the boosting rectifier means has unidirectional devices connected in the form of a ordinary bridge circuit and having positive and negative second DC output terminals, respectively.

16. An electronic device adapted for powering a gas discharge load from a low frequency alternating voltage source, the device having DC terminals and comprising:
   rectifier means having unidirectional devices and exhibiting a switching action characterized by ON-time period when conducting electrical current, and characterized by OFF-time period when not conducting electrical current;
   boosting capacitance means having boost input terminal and operable to provide between the DC terminals a pulsating DC voltage having absolute peak magnitude higher then absolute peak magnitude of a rectified voltage of the alternating voltage source;
   energy storage means having input terminals and connected with a diode means in series circuit which is connected between the DC terminals, the diode means having its anode electrode connected to the positive DC terminal, and the diode means being operative, in conjunction with the energy storage means, to develop between the input terminals a DC input voltage separated from the pulsating DC voltage, and the energy storage means being operative to receive the energy from the boosting capacitance means during the OFF-time period and whenever an instantaneous magnitude of the pulsating DC voltage is higher than an instantaneous magnitude of the DC input voltage;
   semiconductor switching means connected to the energy storage means and having two alternately conducting transistors connected to form a common junction therebetween;
   resonant oscillator means operable to draw the pulsating current from DC terminals and operable to develop the pulsating DC voltage, and said oscillator circuit comprises: (i) a resonant load circuit coupled to the positive DC terminal and to the common junction of the semiconductor switching means, and having an inductor and a first capacitor connected in series, and having the load connected effectively in parallel to said first capacitor, (ii) a resonant boost circuit having the inductor connected in series with a second resonant capacitor and coupled to the boost input terminal and to the common junction of the semiconductor switching means, and (iii) a switching feedback loop coupled to the semiconductor switching means and responsive to instantaneous magnitude of the pulsating current and operable to deliver to the semiconductor switching means a switching signal modulated in proportion to the modulation of instantaneous magnitude of the pulsating DC voltage;
   wherein the pulsating current, when drawn from the DC terminals, causing the unidirectional devices to exhibit the switching action, thus causing the boosting capacitance means to store and release energy during ON-time and OFF time periods being proportional to a time period of half-cycle associated with the frequency of oscillation of the resonant oscillator means; each of the alternately conducting transistors having a duty cycle associated with the conduction, and said duty cycle is automatically modulated in proportion to the modulated amplitude of the pulsating DC voltage; the frequency of oscillation of the resonant oscillator means is considerable faster than half-cycle frequency of the alternating voltage source; whereby, an instantaneous magnitude of a current drawn from the alternating voltage source is substantially proportional to an instantaneous magnitude of the voltage of the alternating voltage source.

17. The device according to claim 16 wherein the boosting capacitance means has two capacitors connected in series via boost input terminal.

18. The device according to claim 16 wherein the switching feedback loop is equipped with a saturable current transformer made with a toroidal ferrite core having an initial permability of 5000 or more and size of 6 millimeters in diameter and 3 millimeter in height.

19. The device according to claim 16 wherein the resonant oscillator means has the switching feedback loop equipped with a control circuit.

20. An electronic device adapted for powering a gas discharge load from a low frequency alternating voltage source, the device having DC terminals and comprising:
rectifier means having unidirectional devices and exhibiting a switching action characterized by ON-time period when conducting electrical current, and characterized by OFF-time period when not conducting electrical current;
boosting capacitance means having boost input terminal and operable to provide between the DC terminals a pulsating DC voltage having absolute peak magnitude higher then absolute peak magnitude of a rectified voltage of the alternating voltage source;
energy storage means having input terminals and connected with a diode means in series circuit which is connected between the DC terminals, the diode means having its anode electrode connected to the positive DC terminal, and the diode means being operative, in conjunction with the energy storage means, to develop between the input terminals a DC input voltage separated from the pulsating DC voltage, and the energy storage means being operative to receive the energy from the boosting capacitance means during the OFF-time period and whenever an instantaneous magnitude of the pulsating DC voltage is higher than an instantaneous magnitude of the DC input voltage;
semiconductor switching means connected to the energy storage means and having two alternately conducting transistors connected to form a common junction therebetween;
resonant oscillator means operable to draw the pulsating current from DC terminals and operable to develop the pulsating DC voltage, and said oscillator circuit comprises: (i) a parallel-resonant load circuit coupled to the positive DC terminal and to the common junction of the semiconductor switching means, and having an inductor and a first capacitor connected in parallel circuit, and having the load connected effectively in parallel to said parallel circuit, (ii) a series-resonant boost circuit having the inductor connected in series with a second resonant capacitor and coupled to the boost input terminal and to the common junction of the semiconductor switching means, and (iii) a switching feedback loop coupled to the semiconductor switching means and responsive to instantaneous magnitude of the pulsating current and operable to deliver to the semiconductor switching means a switching signal modulated in proportion to the modulation of instantaneous magnitude of the pulsating DC voltage;
wherein the pulsating current, when drawn from the DC terminals, causing the unidirectional devices to exhibit the switching action, thus causing the boosting capacitance means to store and release energy during ON-time and OFF time periods being proportional to a time period of half-cycle associated with the frequency of oscillation of the resonant oscillator means; each of the alternately conducting transistors having a duty cycle associated with the conduction, and said duty cycle is automatically modulated in proportion to the modulated amplitude of the pulsating DC voltage; the frequency of oscillation of the resonant oscillator means is considerable faster than half-cycle frequency of the alternating voltage source; whereby, an instantaneous magnitude of a current drawn from the alternating voltage source is substantially proportional to an instantaneous magnitude of the voltage of the alternating voltage source.

21. The device .according to claim 20 wherein the switching feedback loop is equipped with either, non-saturable or saturable, current transformer with one primary winding and two secondary windings.

22. The device according to claim 20 wherein the switching feedback loop is equipped with two secondary windings magnetically coupled to the inductor and connected to the semiconductor switching means, respectively.

23. An electronic device for powering a gas discharge load from a low frequency power line source, the device is drawing current proportional to a voltage of the power line and is constituted by an oscillator circuit comprised of two integrated and synchronized resonant circuits having two resonant capacitors and one common resonant inductor wherein one circuit is used to operate the load and the other to provide boosted pulsating DC voltage to be naturally added to and integrated with rectified voltage of the power line source.

* * * * *